F1960 XR T 856,013

CROSS REFERENCE

T856013

147

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 335

556,009

FORM COATING PROCESS

Richard D. Samson, Levittown, Pa., assignor to Thiokol Chemical Corporation, Bristol, Pa., a corporation of Delaware

Original application Jan. 28, 1963, Ser. No. 254,447. Divided and this application Apr. 21, 1966, Ser. No. 556,009. Published Nov. 12, 1968

Class 264—255

No Drawing. 8 Pages Specification

The invention consists of a process for making so called "dipped articles," such as, girdles, from urethane materials. The process comprises applying to a form at least one layer of a coating composition comprising a solution of partially blocked urethane prepolymer, curing catalyst and curing agent for the prepolymer, air drying the coated form after at least one of the coating layers has been applied to the form, heating the coated form at polymer curing temperatures, and stripping the resulting cured product from the form. The prepolymer has an NCO/active hydrogen blocking ratio of at least about 2 to 10 and an NCO/active hydrogen curing ratio of about 0.7 to 2.